United States Patent
Heijna

(12) 
(10) Patent No.: US 7,235,985 B2
(45) Date of Patent: Jun. 26, 2007

(54) METHOD AND DEVICE FOR SIGNAL AMPLITUDE DETECTION

(75) Inventor: Roeland John Heijna, Nijmegen (NL)

(73) Assignee: NXP B.V., Eindhoven (NL)

( * ) Notice: Subject to any disclaimer, the term of this patent is extended or adjusted under 35 U.S.C. 154(b) by 237 days.

(21) Appl. No.: 10/531,400

(22) PCT Filed: Sep. 22, 2003

(86) PCT No.: PCT/IB03/04229

§ 371 (c)(1),
(2), (4) Date: Apr. 14, 2005

(87) PCT Pub. No.: WO2004/036859

PCT Pub. Date: Apr. 29, 2004

(65) Prior Publication Data

US 2006/0012381 A1    Jan. 19, 2006

(30) Foreign Application Priority Data

Oct. 17, 2002    (EP)    .................................. 02079305

(51) Int. Cl.
*G01R 27/26*    (2006.01)

(52) U.S. Cl. ...................................... 324/672; 324/606
(58) Field of Classification Search ................ 324/606, 324/672
See application file for complete search history.

(56) References Cited

U.S. PATENT DOCUMENTS 2,798,198 A * 7/1957 Dauphinee ................... 324/705
4,363,977 A * 12/1982 Tsuda et al. ................... 327/73
6,324,232 B1* 11/2001 Mirfakhraei ................. 375/350
6,462,558 B1* 10/2002 Taurand ....................... 324/606

* cited by examiner

*Primary Examiner*—Walter Benson

(57) ABSTRACT

A method and a device (1) for detecting signal amplitudes by removing any DC component from the signal and then shifting the signal by a shift amount so as to produce a shifted signal having a first signal level equal to a reference level (Vref). The shift amount provides an indication of the amplitude of the signal. To this end, the device (1) includes a decoupling circuit (2), a shift circuit (3) and an output terminal (4). Optionally the device further includes a differential amplifier (5) coupled to receive the reference level (Vref) and an indication of the power of the shifted signal, and a signal power determination circuit (6) coupled between the shift circuit (3) and the differential amplifier (5).

7 Claims, 2 Drawing Sheets

METHOD AND DEVICE FOR SIGNAL AMPLITUDE DETECTION

Figure 1:
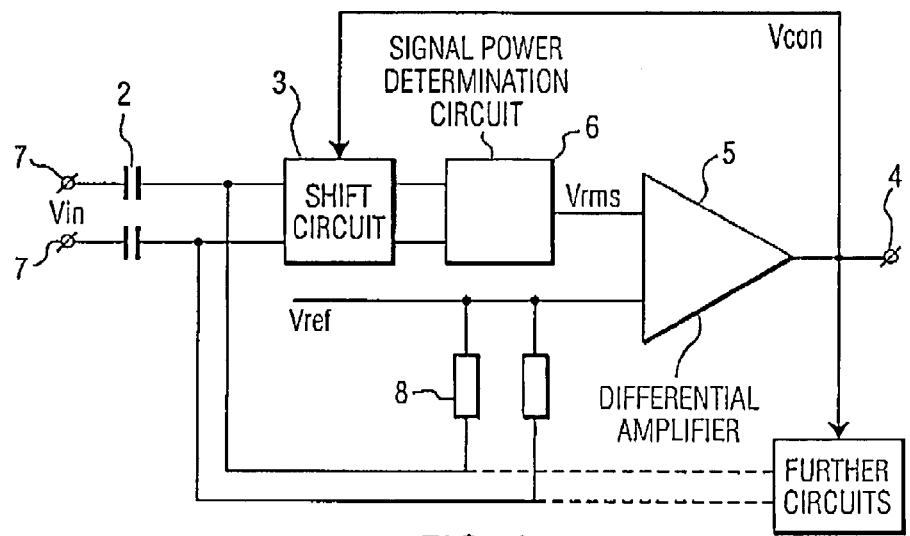

Present invention relates to a method and a device for signal amplitude detection. More in particular, the present invention relates to a method and a device for determining the amplitude of a signal having a first signal level and a second signal level, such as binary signals.

Signals of this kind typically have an average signal level, which is halfway between the said first and second signal levels. The average signal level could be particularly zero volts when the first and the second levels are symmetrically to zero volt level i.e. they are +V and −V. The amplitude of the above mentioned signals is defined as the half difference between the first level and the second level.

In many applications it is desirable or necessary to determine the amplitude of the signal in a simple manner. It is furthermore desirable to control the signal levels relative to the average signal level for compatibility with any supply voltages of the circuits processing the signal. The average signal level determines a DC component in the signal.

It is therefore an object of the present invention to provide a method for determining the amplitude of a signal having a first signal level and a second signal level, the method comprising the steps of:

removing any DC component from the signal so as to produce an intermediate signal having an average level equal to a reference level, shifting the intermediate signal by a shift amount so as to produce a shifted signal having a first signal level equal to the reference level, and providing said shift amount as an indication of the amplitude of the signal.

By shifting the signal in such a way that a first signal level equals a reference level, which reference level is preferably predetermined, the average signal level is shifted by an amount equal to its amplitude. As a result, the amount of the signal shift represents the amplitude of the signal.

Additionally, shifting the average signal level allows control of all signal levels, thus making it possible that signal levels stay within suitable limits.

Preferably, the shift amount is determined on the basis of the shifted signal and the reference level. That is, the amount of the signal shift is obtained from the shifted signal itself and the reference level. This typically involves the use of feedback.

Advantageously, the shift amount is continuously determined. Thus the signal level is shifted by the correct amount, irrespective of any changing external circumstances, and a reliable amplitude measurement is obtained.

It will be understood that in situations where the original signal has a DC level equal to zero, the step of removing any DC component from the signal may be omitted.

The present invention further provides a device for determining the amplitude of a signal having a first signal level and a second signal level, the device comprising:

a decoupling circuit for removing any DC component from the signal so as to produce an intermediate signal having an average level equal to a reference level, a shift circuit for shifting the intermediate signal by a shift amount so as to produce a shifted signal having a first signal level equal to the reference level, and an output terminal for providing said shift amount as an indication of the amplitude of the signal.

Such a device employs the same inventive concept as the method described above: by shifting the signal level over an amount equal to its amplitude, the amplitude itself is obtained.

Preferably, the shift circuit is coupled to an output of a differential amplifier which is coupled to receive the reference level and an indication of the power of the shifted signal.

Advantageously, a signal power determination circuit is coupled between the shift circuit and the differential amplifier.

It will be understood that in situations where the original signal has a DC level equal to zero, the decoupling circuit may be omitted.

In a preferred embodiment, the reference level is equal to a supply voltage, such as a positive supply voltage. However, other reference levels, such as those generated by dedicated circuits, may also be used.

Figure 2:
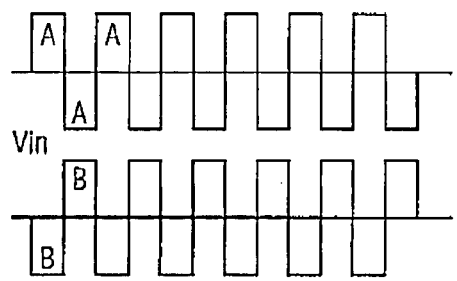
Figure 3:
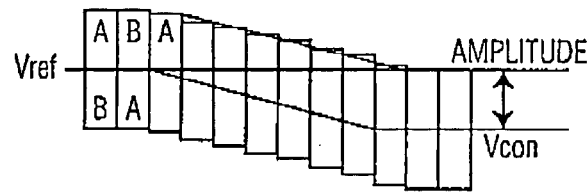
Figure 4:
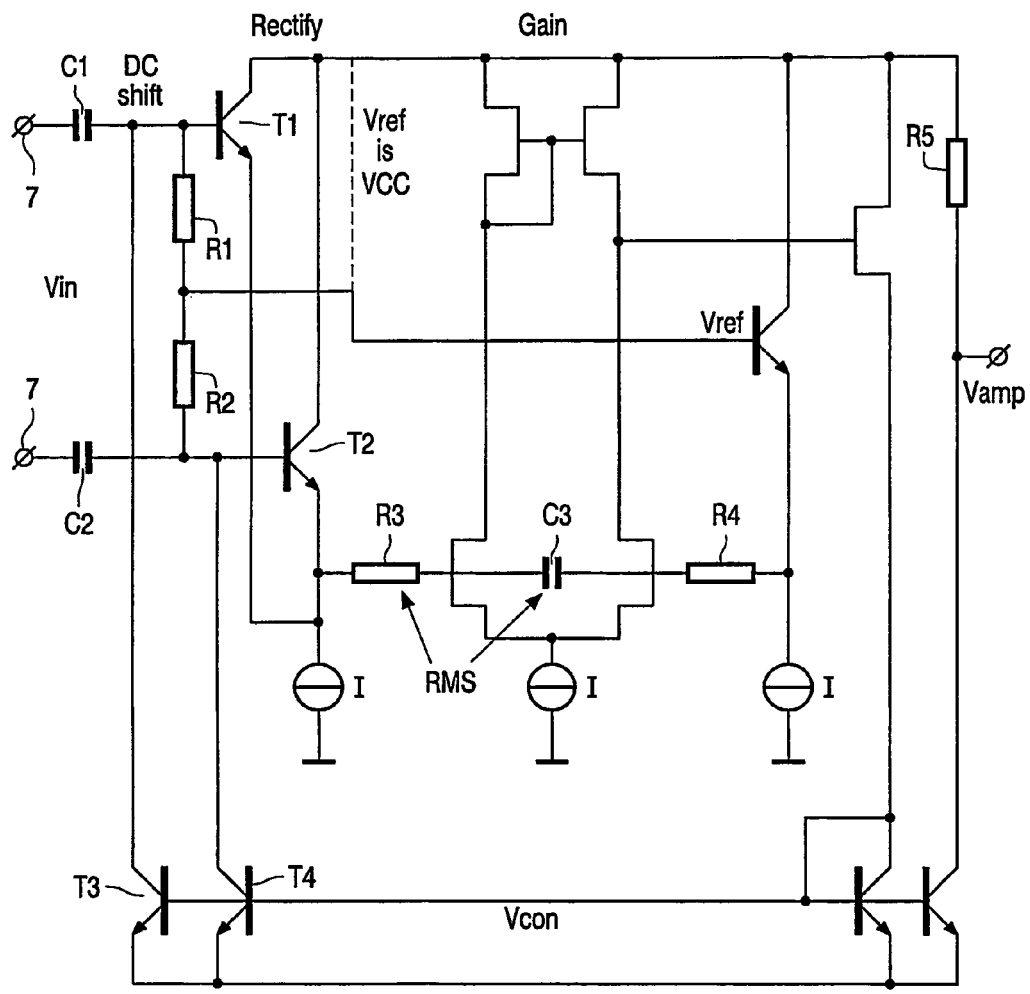

The present invention will further be explained below with reference to exemplary embodiments illustrated in the accompanying drawings, in which:

FIG. 1 schematically shows a circuit diagram of an amplitude detector according to the present invention;

FIG. 2 schematically shows input signals which may be applied to the circuit of FIG. 1;

FIG. 3 schematically shows the signals of FIG. 2 as effected by the circuit of FIG. 1; and FIG. 4 schematically shows an embodiment of the amplitude detector of the present invention.

The amplitude detector 1 shown merely by way of non-limiting example in FIG. 1 comprises a decoupling circuit 2, a shift circuit 3, an output terminal 4, a differential amplifier 5, a signal power determination circuit 6, input terminals 7 and a coupling circuit 8.

The decoupling circuit 2 is constituted by two capacitors, which remove any DC component present in the signal supplied to the input terminals 7. The shift circuit 3 is known per se, however an advantageous embodiment will be discussed below with reference to FIG. 4. The output terminal 4 is connected to the output of differential amplifier 5. The input terminals of differential amplifier 5 are connected to the signal power determination circuit 6 and to the reference voltage $V_{ref}$ respectively. The reference voltage may conveniently be a supply voltage of the circuit, or ground.

Signal power determination circuit 6 is known per se, however an advantageous embodiment will be discussed below with reference to FIG. 4. Signal power determination circuit 6 rectifies the signal and preferably determines the so-called root mean square value of the signal, a well-known measure for the energy contained in the signal. Coupling circuit 8, constituted by two resistors, couples the intermediary signal i. e. the input signal from which the DC component has been removed) to the non-inverting input of differential amplifier 5.

The operation of the amplitude detector 1 of FIG. 1 will now be explained with reference to FIGS. 2 and 3, which show exemplary signals.

FIG. 2 shows an first signal A supplied to a first (e.g. top) input terminal 7 and a second signal B supplied to a second (e.g. bottom) input terminal 7. Together, these signals constitute the input signal $V_{in}$. As can be seen from FIG. 2, the second signal B is the inverse of the first signal A i.e. mutually in anti-phase with the first signal A. To avoid any unnecessary complications, it is assumed that the average signal level (DC component) of the complimentary signals A and B is zero.

The shift circuit 3 is, in this particular embodiment, arranged such that no signal shift is effected when the control signal $V_{con}$ which is inputted to the shift circuit is zero. As can be seen, in this embodiment the control signal $V_{con}$ is the output voltage of differential amplifier 5. Consequently, there will be no signal shift when the output signal $V_{rms}$ of the signal power determination circuit 6 is equal to the reference voltage $V_{ref}$.

FIG. 3 shows the progression of the signal levels when the control signal $V_{con}$, after initially being interrupted, is fed to the shift circuit 3. In this particular example it is assumed that $V_{ref}$ has a lower value than $V_{rms}$. For example, $V_{ref}$ may be equal to zero volts (ground). In this example, the average signal value is initially equal to $V_{ref}$.

As $V_{rms}$ is greater than $V_{ref}$, differential amplifier 5 produces a negative control signal $V_{con}$. As shown in FIG. 3, this negative control signal $V_{con}$ is passed on to the shift circuit 3 after one period of the input signal $V_{in}$ (see also FIG. 2). This in turn causes a negative signal shift in the input signal, thus lowering its average value. This is shown in FIG. 3. After a few cycles, the average value is stabilised at the level of the control signal $V_{con}$, the absolute value of which is exactly the amplitude of the input signal $V_{in}$. Hence, the signal at the output terminal 4 (see FIG. 1) is a reliable indication of the signal amplitude.

As can be seen, the device of the present invention is relatively simple, while its feedback loop provides a continuous adjustment, thus allowing to follow any changes in the amplitude or to compensate any adverse environmental effects such as a temperature change.

The embodiment of FIG. 4 contains all circuits of FIG. 1. The decoupling circuit 2 is again constituted by two capacitors C1 And C2 while resistors R1 and R2 constitute coupling circuit 8. The shift circuit 3 involves transistors T3 and T4, which influence the base voltages of transistors T1 and T2, which in turn rectify the incoming signals. The RMS (Root Mean Square) value of the signal is achieved by means of a capacitor C3 and two resistors R3, R4 coupled to the differential amplifier ("gain") section of the circuit. Current sources, which are well known in the art, are shown to provide suitable currents I. An output resistor R5 provides the output signal Vamp at the output terminal 4.

As explained above, the amplitude detector 1 of FIGS. 1 and 4 embodies the method of the present invention.

The present invention is based upon the insight that shifting the average signal level (DC level) of a signal by such an amount that a maximum or minimum signal value equals a reference level (for example zero volts) produces an excellent indication of the signal amplitude. The present invention is based on the further insight that a very efficient way of realising this shifting of the average signal level is by using a feedback loop.

It will be understood by those skilled in the art that the present invention is not limited to the embodiments illustrated above and that many modifications and additions may be made without departing from the scope of the invention as defined in the appending claims.

The invention claimed is:

1. Method for determining the amplitude of a signal having a first signal level and a second signal level, the method comprising the steps of:
   removing any DC component from the signal so as to produce an intermediate signal having an average level equal to a reference level,
   shifting the intermediate signal by a shift amount so as to produce a shifted signal having a first signal level equal to the reference level, and
   providing said shift amount as an indication of the amplitude of the signal.

2. Method according to claim 1, wherein the shifted signal and the reference level determines the shift amount.

3. Method according to claim 1, wherein the shift amount is continuously determined.

4. Device for determining the amplitude of a signal having a first signal level and a second signal level, the device comprising:
   a decoupling circuit for removing any DC component from the signal so as to produce an intermediate signal having an average level equal to a reference level,
   a shift circuit for shifting the intermediate signal by a shift a amount so as to produce a shifted signal having a first signal level equal to the reference level, and
   an output terminal for providing said shift amount as an indication of the amplitude of the signal.

5. Device according to claim 4, wherein the shift circuit is coupled to an output of a differential amplifier which is coupled to receive the reference level and a signal, which is indicative for the power of the shifted signal.

6. Device according to claim 5, wherein a signal power determination circuit is coupled between the shift circuit and the differential amplifier.

7. Device according to claim 4, wherein the reference level is equal to a supply voltage.

* * * * *